(12) United States Patent
Zhang

(10) Patent No.: US 10,200,986 B2
(45) Date of Patent: Feb. 5, 2019

(54) TERMINAL DEVICE AND D2D RESOURCE MANAGEMENT METHOD

(71) Applicant: Huawei Technologies Co., Ltd., Shenzhen, Guangdong (CN)

(72) Inventor: Qizhi Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 51 days.

(21) Appl. No.: 15/388,283

(22) Filed: Dec. 22, 2016

(65) Prior Publication Data

US 2017/0105204 A1    Apr. 13, 2017

Related U.S. Application Data

(63) Continuation of application No. PCT/CN2014/080958, filed on Jun. 27, 2014.

(51) Int. Cl.
    *H04W 4/00*    (2018.01)
    *H04W 72/04*   (2009.01)
    *H04W 28/16*   (2009.01)
    *H04W 76/14*   (2018.01)

(52) U.S. Cl.
    CPC ......... *H04W 72/042* (2013.01); *H04W 28/16* (2013.01); *H04W 72/0413* (2013.01); *H04W 76/14* (2018.02)

(58) Field of Classification Search
    CPC .. H04W 72/048; H04W 72/121; H04W 76/14
    See application file for complete search history.

(56) References Cited

U.S. PATENT DOCUMENTS

| | | | |
|---|---|---|---|
| 2011/0282989 A1 | 11/2011 | Geirhofer et al. | |
| 2014/0094183 A1 | 4/2014 | Gao et al. | |
| 2014/0141789 A1 | 5/2014 | Tarokh et al. | |
| 2014/0301239 A1 | 10/2014 | Fukuta et al. | |
| 2016/0242152 A1* | 8/2016 | Yu et al. ............... | H04W 76/14 370/328 |

FOREIGN PATENT DOCUMENTS

| | | |
|---|---|---|
| CN | 102118797 A | 7/2011 |
| CN | 103108329 A | 5/2013 |
| CN | 103634852 A | 3/2014 |
| CN | 103843444 A | 6/2014 |
| JP | 2014103693 A | 6/2014 |
| WO | 2010049801 A1 | 5/2010 |
| WO | 2013080286 A1 | 6/2013 |

* cited by examiner

*Primary Examiner* — Melanie Jagannathan

(57) ABSTRACT

Embodiments of the present invention disclose a terminal device, including: an obtaining unit, configured to: when a user terminal UE needs to perform D2D communication, obtain a quantity of available D2D resources in a D2D resource pool including at least one D2D resource; a determining unit, configured to determine whether the quantity of available D2D resources is less than or equal to a preset threshold; and a responding unit, configured to, when the quantity of available D2D resources is less than or equal to the preset threshold, respond to a report instruction broadcast by a base station and return response information, so that the base station manages the D2D resource pool according to the response information.

13 Claims, 4 Drawing Sheets

TERMINAL DEVICE AND D2D RESOURCE MANAGEMENT METHOD

CROSS-REFERENCE TO RELATED APPLICATIONS

This application is a continuation of International Application No. PCT/CN2014/080958, filed on Jun. 27, 2014, the disclosure of which is hereby incorporated by reference in its entirety.

TECHNICAL FIELD

The present invention relates to the field of communications technologies, and in particular, to a terminal device and a D2D resource management method.

BACKGROUND

As various new wireless services emerge, people impose an increasingly high requirement for a communication rate. However, there are only extremely limited resources that can be applied to wireless communication. Therefore, with the limited resources, it is significantly important to improve resource usage, so as to provide a high enough data communication rate to meet a requirement of a user. device-to-device (D2D) communication is a technology that is applied to a cellular network and in which a cellular cell resource is reused for direct short-range communication under system control. A local network throughput can be effectively increased and the resource usage can be improved by applying the D2D technology to the cellular network.

However, to effectively use resources in a technical process in which a base station reuses the cellular cell resource to perform direct short-range communication, the base station needs to master a D2D resource usage condition at any time, so as to effectively allocate an optimal resource capacity and achieve results of saving the resource and improving the resource usage.

In an existing process in which the base station obtains the D2D resource usage condition, a terminal device in a connected state reports a usage condition of an obtained resource, so that the base station can dynamically master the D2D resource usage condition. However, only in the connected state, the terminal device can perform data transmission with the base station. Therefore, when too many terminal devices need to perform reporting because of an emergency event, uplink network congestion is caused, and normal communication cannot be performed.

SUMMARY

Embodiments of the present invention provide a terminal device and a D2D resource management method, to improve flexibility of sending D2D resource information by a UE end.

According to a first aspect, an embodiment of the present invention provides a terminal device, where the terminal device may include:

an obtaining unit, configured to: when a user terminal UE needs to perform D2D communication, obtain a quantity of available D2D resources in a D2D resource pool including at least one D2D resource;

a determining unit, configured to determine whether the quantity of available D2D resources is less than or equal to a preset threshold; and a responding unit, configured to, when the quantity of available D2D resources is less than or equal to the preset threshold, respond to a report instruction broadcast by a base station and return response information, so that the base station manages the D2D resource pool according to the response information.

With reference to the first aspect, in a first possible implementation manner, the obtaining unit includes:

a calculation subunit, configured to calculate a quantity of all D2D resources whose signal strength is less than or equal to a third threshold in the D2D resource pool.

With reference to the first aspect or the first possible implementation manner of the first aspect, in a second possible implementation manner, the threshold includes a first threshold and/or a second threshold.

With reference to the second possible implementation manner of the first aspect, in a third possible implementation manner, the responding unit includes:

a first responding unit, configured to, when the quantity of available D2D resources is less than or equal to the first threshold, respond to an overflow report instruction broadcast by the base station and return first response information.

With reference to the third possible implementation manner of the first aspect, in a fourth possible implementation manner, the first responding subunit includes:

a first receiving subunit, configured to receive the overflow report instruction broadcast by the base station;

a first generation subunit, configured to generate the first response information according to the overflow report instruction; and a first sending subunit, configured to transmit the first response information to the base station by using a report resource allocated by the base station.

With reference to the second possible implementation manner of the first aspect to the fourth possible implementation manner of the first aspect, in a fifth possible implementation manner, the responding unit further includes:

a second responding subunit, configured to, when the quantity of available D2D resources is less than the preset second threshold, respond to a reduction report instruction broadcast by the base station and return second response information by the UE.

With reference to the fifth possible implementation manner of the first aspect, in a sixth possible implementation manner, the second responding subunit includes:

a second receiving subunit, configured to receive the reduction report instruction broadcast by the base station;

a second generation unit, configured to generate the second response information according to the reduction report instruction; and a second sending unit, configured to transmit the second response information to the base station by using the report resource.

With reference to the third possible implementation manner of the first aspect to the sixth possible implementation manner of the first aspect, in a seventh possible implementation manner, signal strength of the first response information is inversely proportional to signal strength of the first report instruction.

With reference to the fifth possible implementation manner of the first aspect to the seventh possible implementation manner of the first aspect, in an eighth possible implementation manner, signal strength of the second response information is inversely proportional to signal strength of the second report instruction.

According to a second aspect, an embodiment of the present invention provides a D2D resource management method, where the D2D resource management method may include:

when a user terminal UE needs to perform D2D communication, obtaining, by the UE, a quantity of available D2D resources in a D2D resource pool including at least one D2D resource;

determining, by the UE, whether the quantity of available D2D resources is less than or equal to a preset threshold; and when the quantity of available D2D resources is less than or equal to the preset threshold, responding, by the UE, to a report instruction broadcast by a base station and returning response information, so that the base station manages the D2D resource pool according to the response information.

With reference to the second aspect, in a first possible implementation manner, the obtaining, by the UE, a quantity of available D2D resources in a D2D resource pool including at least one D2D resource includes:

calculating, by the UE, a quantity of all D2D resources whose signal strength is less than or equal to a third threshold in the D2D resource pool.

With reference to the second aspect or the first possible implementation manner of the second aspect, in a second possible implementation manner, the threshold includes a first threshold and/or a second threshold.

With reference to the second possible implementation manner of the second aspect, in a third possible implementation manner, when the quantity of available D2D resources is less than or equal to the preset threshold, the responding, by the UE, to a report instruction broadcast by a base station and returning response information includes:

when the quantity of available D2D resources is less than or equal to the first threshold, responding, by the UE, to an overflow report instruction broadcast by the base station and returning first response information.

With reference to the third possible implementation manner of the second aspect, in a fourth possible implementation manner, when the quantity of available D2D resources is less than or equal to the preset first threshold, the responding, by the UE, to a first report instruction broadcast by the base station and returning first response information includes:

receiving, by the UE, the overflow report instruction broadcast by the base station;

generating, by the UE, the first response information according to the overflow report instruction; and transmitting, by the UE, the first response information to the base station by using a report resource allocated by the base station.

With reference to the second possible implementation manner of the second aspect to the fourth possible implementation manner of the second aspect, in a fifth possible implementation manner, when the quantity of available D2D resources is less than or equal to the preset threshold, the responding, by the UE, to a report instruction broadcast by the base station and returning response information includes:

when the quantity of available D2D resources is less than the preset second threshold, responding, by the UE, to a reduction report instruction broadcast by the base station and returning second response information.

With reference to the fifth possible implementation manner of the second aspect, in a sixth possible implementation manner, the responding, by the UE, to a reduction report instruction broadcast by the base station and returning second response information includes:

receiving, by the UE, the reduction report instruction broadcast by the base station;

generating, by the UE, the second response information according to the reduction report instruction; and transmitting, by the UE, the second response information to the base station by using the report resource.

With reference to the third possible implementation manner of the second aspect to the sixth possible implementation manner of the second aspect, in a seventh possible implementation manner, signal strength of the first response information is inversely proportional to signal strength of the first report instruction.

With reference to the fifth possible implementation manner of the second aspect to the seventh possible implementation manner of the second aspect, signal strength of the second response information is inversely proportional to signal strength of the second report instruction.

According to a fourth aspect, an embodiment of the present invention provides a computer storage medium, where the computer storage medium may store a program, and when the program is executed, the steps according to other embodiment(s) described herein.

According to the fourth aspect, an embodiment of the present invention provides a terminal device, where the terminal device may include:

an input apparatus, an output apparatus, a memory, and a processor, where the memory stores a group of program code, and the processor is configured to invoke the program code stored in the memory to perform the following operations:

when a user terminal UE needs to perform D2D communication, obtain a quantity of available D2D resources in a D2D resource pool including at least one D2D resource;

determine whether the quantity of available D2D resources is less than or equal to a preset threshold; and when the quantity of available D2D resources is less than or equal to the preset threshold, respond to a report instruction broadcast by a base station and control the output apparatus to return response information, so that the base station manages the D2D resource pool according to the response information.

With reference to the fourth aspect, in a first possible implementation manner, that the processor obtains the quantity of available D2D resources in the D2D resource pool including at least one D2D resource includes:

calculating a quantity of all D2D resources whose signal strength is less than or equal to a third threshold in the D2D resource pool.

With reference to the fourth aspect or the first possible implementation manner of the fourth aspect, in a second possible implementation manner, the threshold includes a first threshold and/or a second threshold.

With reference to the second possible implementation manner of the fourth aspect, in a third possible implementation manner, that when the quantity of available D2D resources is less than or equal to the preset threshold, the processor responds to the report instruction broadcast by the base station and returns the response information includes:

when the quantity of available D2D resources is less than or equal to the first threshold, responding to an overflow report instruction broadcast by the base station and controlling the output apparatus to return first response information.

With reference to the third possible implementation manner of the fourth aspect, in a fourth possible implementation manner, that when the quantity of available D2D resources is less than or equal to the preset first threshold, the processor responds to the first report instruction broadcast by the base station and controls the output apparatus to return the first response information includes:

controlling the input apparatus to receive the overflow report instruction broadcast by the base station;

generating the first response information according to the overflow report instruction; and controlling the output apparatus to transmit the first response information to the base station by using a report resource allocated by the base station.

With reference to the second possible implementation manner of the fourth aspect to the fourth possible implementation manner of the fourth aspect, in a fifth possible implementation manner, that when the quantity of available D2D resources is less than or equal to the preset threshold, the processor responds to the report instruction broadcast by the base station and controls the output apparatus to return the response information includes:

when the quantity of available D2D resources is less than the preset second threshold, responding to a reduction report instruction broadcast by the base station and controlling the output apparatus to return second response information.

With reference to the fifth possible implementation manner of the fourth aspect, in a sixth possible implementation manner, that the processor responds to the reduction report instruction broadcast by the base station and control the output apparatus to return the second response information includes:

controlling the input apparatus to receive the reduction report instruction broadcast by the base station;

generating the second response information according to the reduction report instruction; and controlling the output apparatus to transmit the second response information to the base station by using the report resource.

With reference to the third possible implementation manner of the fourth aspect to the sixth possible implementation manner, in a seventh possible implementation manner, signal strength of the first response information is inversely proportional to signal strength of the first report instruction.

With reference to the fifth possible implementation manner of the fourth aspect to the seventh possible implementation manner, in an eighth possible implementation manner, signal strength of the second response information is inversely proportional to signal strength of the second report instruction.

It can be learned from the foregoing that, according to the embodiments of the present invention, when a user terminal UE needs to perform D2D communication, the UE obtains a quantity of available D2D resources in a D2D resource pool including at least one D2D resource; determines whether the quantity of available D2D resources is less than or equal to a preset threshold; and when the quantity of available D2D resources is less than or equal to the preset threshold, responds to a report instruction broadcast by a base station and returns response information, so that the base station manages the D2D resource pool according to the response information. Therefore, network congestion can be reduced and flexibility of sending D2D resource information by a UE end can be improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, the terminal device may include an intelligent user terminal device, such as a mobile phone, a notebook computer, or a tablet computer.

Figure 1:
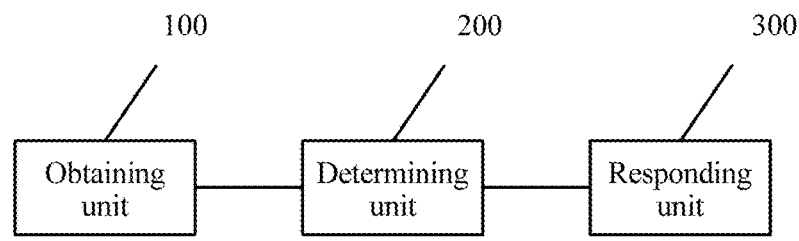
FIG. 1 is a structural diagram of an embodiment of a terminal device according to the present invention.

Referring to a structural diagram of a terminal device shown in FIG. 1, the terminal device shown in this embodiment of the present invention includes an obtaining unit 100, a determining unit 200, and a responding unit 300.

The obtaining unit 100 is configured to: when a user terminal UE needs to perform D2D communication, obtain a quantity of available D2D resources in a D2D resource pool including at least one D2D resource.

In this embodiment of the present invention, the D2D communication is a technology that is applied to a cellular network and in which a cellular cell resource is reused for direct short-range communication under system control. The D2D communications technology changes a communications manner in which originally a base station performs forwarding, to direct communication between UEs (User Equipment, user equipment) that need to perform communication. However, the base station still remains control information transmission with a pair of D2D UEs, so as to implement functions such as interference control and charging, and allocate a D2D resource to a D2D user, so that D2D communication operates on a licensed frequency band. Therefore, data does not need to be transferred by the base station, but is directly transmitted between UEs, thereby lowering communication load on the base station and reducing an occupied communication resource.

In this embodiment of the present invention, when establishing D2D communication, the base station allocates a D2D resource to a user terminal that performs D2D communication, so that the UE can send data by using the D2D resource; or the base station may predefine a D2D resource required for D2D communication, so that the UE can send data by using the D2D resource. According to a specific requirement, the base station allocates a D2D resource pool including at least one D2D resource to the UE that performs D2D communication, so that the user equipment can randomly search for an available D2D resource in the resource pool to perform data transmission. The D2D resource may be a spectrum resource.

Further, in this embodiment of the present invention, when the UE needs to discover a device to perform D2D communication with another UE, the UE needs to use the D2D resource to send a D2D signal to discover the device. Therefore, before the UE sends the D2D signal, the obtaining unit 100 of the UE first obtains the quantity of available D2D resources in the D2D resource pool allocated by the base station. The available D2D resource may be a D2D resource that is of low interference strength and suitable for communication. In this embodiment of the present invention, the available D2D resource may be a D2D resource whose signal strength is less than a third threshold. Therefore, the UE obtains a quantity of D2D resources, in the D2D resource pool, whose signal strength is less than the third threshold. The third threshold may be a value set by technical personnel.

Further, when signal strength of a D2D resource is greater than the third threshold, interference strength of the D2D resource may be relatively high and the D2D resource is not suitable for communication; or when communication is further performed, the D2D resource interferes with communication data and affects communication quality. Therefore, the D2D resource may be referred to as an unavailable D2D resource.

The determining unit 200 is configured to determine whether the quantity of available D2D resources is less than or equal to a preset threshold.

In this embodiment of the present invention, the threshold may include a first threshold and a second threshold. The first threshold may be less than the second threshold, and the first threshold and the second threshold may be values set by the technical personnel.

The responding unit 300 is configured to, when the quantity of available D2D resources is less than or equal to the preset threshold, respond to a report instruction broadcast by a base station and return response information, so that the base station manages the D2D resource pool according to the response information.

In this embodiment of the present invention, the report instruction broadcast by the base station may include an overflow report instruction and a reduction report instruction. When the quantity, of available D2D resources, obtained by the UE is less than or equal to the first threshold, the UE may determine itself as overflow UE, that is, UE that does not have enough available D2D resources to use. The overflow report instruction is an instruction periodically broadcast by the base station, and is used to: when the UE is overflow UE, instruct the responding unit 300 of the UE to respond to the overflow report instruction. Therefore, when the UE may determine itself as overflow UE and receives the overflow report instruction broadcast by the base station, the responding unit 300 of the UE responds to the overflow report instruction and returns first response information, so that the base station manages the D2D resource pool according to the first response information.

Further, when the quantity, of available D2D resources, obtained by the UE is less than or equal to the second threshold, the UE may determine itself as UE for which resource reduction does not need to be performed. The reduction report instruction is an instruction periodically broadcast by the base station, and is used to: when the UE is UE for which resource reduction does not need to be performed, instruct the responding unit 300 of the UE to respond to the reduction report instruction. Therefore, when the UE receives the reduction report instruction broadcast by the base station and may determine itself as UE for which resource reduction does not need to be performed, the responding unit 300 of the UE responds to the reduction report instruction and returns second response information, so that the base station manages the D2D resource pool according to the second response information.

Preferably, when the quantity, of available D2D resources, obtained by the UE is less than or equal to the first threshold, the responding unit 300 of the UE may respond to the overflow report instruction and the reduction report instruction.

In this embodiment of the present invention, according to this embodiment of the present invention, when a user terminal UE needs to perform D2D communication, the UE obtains a quantity of available D2D resources in a D2D resource pool including at least one D2D resource; determines whether the quantity of available D2D resources is less than or equal to a preset threshold; and when the quantity of available D2D resources is less than or equal to the preset threshold, responds to a report instruction broadcast by a base station and returns response information, so that the base station manages the D2D resource pool according to the response information. Therefore, network congestion can be reduced and flexibility of sending D2D resource information by a UE end can be improved.

Figure 2:
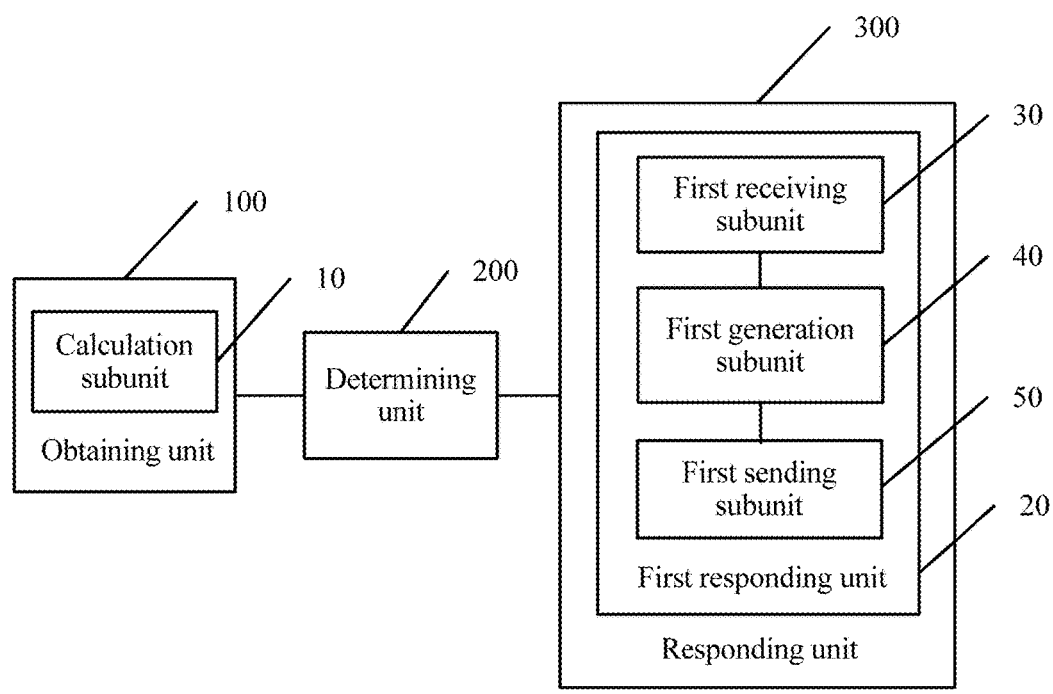
FIG. 2 is a structural diagram of another embodiment of a terminal device according to the present invention.

Referring to a structural diagram of a terminal device shown in FIG. 2, the terminal device shown in this embodiment of the present invention includes an obtaining unit 100, a determining unit 200, and a responding unit 300.

The obtaining unit 100 includes:
a calculation subunit 10, configured to calculate a quantity of all D2D resources whose signal strength is less than or equal to a third threshold in the D2D resource pool.

The responding unit 300 includes:
a first responding unit 20, configured to, when the quantity of available D2D resources is less than or equal to a first threshold, respond to an overflow report instruction broadcast by abase station and return first response information.

In this embodiment of the present invention, when the quantity, of available D2D resources, obtained by the UE is less than or equal to the first threshold, the UE may determine itself as overflow UE, that is, UE that does not have enough available D2D resources to use. The overflow report instruction is an instruction periodically broadcast by the base station, and is used to: when the UE is overflow UE, instruct the first responding unit 20 of the UE to respond to the overflow report instruction. Therefore, when the UE may determine itself as overflow UE and receives the overflow report instruction broadcast by the base station, the first responding unit 20 of the UE responds to the overflow report instruction and returns the first response information, so that the base station manages the D2D resource pool according to the first response information.

Specifically, when the quantity of available D2D resources is less than or equal to the first threshold, the UE may determine itself as overflow UE and waits to receive the overflow report instruction broadcast by the base station. After the UE receives the overflow report instruction broadcast by the base station, the first responding unit 20 of the UE may respond to the overflow report instruction, generate the first response information, and report the first response information to the base station, so that the base station learns that overflow UE exists, and can further adjust a D2D resource capacity in the D2D resource pool. After determining itself as overflow UE, the UE does not send a D2D signal anymore and waits to receive the overflow report instruction broadcast by the base station, so that the UE does not interfere with another UE that is communicating. Further, the base station may allocate in advance to the UE a report resource pool including at least one report resource. When reporting the first response information, the first responding unit 20 of the UE may use any report resource. The report resource pool is a report resource that is allocated by the base station to the UE and used to report information.

Specifically, signal strength of the first response information may be inversely proportional to signal strength of the overflow report instruction, so that the base station can parse out, according to the signal strength of the received first response information, signal strength of the report resource used by the UE. A specific parsing process may be as follows: The signal strength of the overflow report instruction is a, a signal attenuation coefficient is k, and signal strength of a random report resource is b. Therefore, the signal strength of the overflow report instruction received by the UE is a*k, the signal strength of the first response information returned by the first responding unit 20 of the UE is b/(a*k), and signal strength of the first response information received by the base station is b/(a*k)*k=b/a. Because the signal strength of the overflow report instruction sent by the base station is a, the base station can learn that the signal strength of the report resource used by the UE is b. Signal strength of a report resource relates to a quantity of UE that uses the report resource to perform reporting. Therefore, it may be understood that, when more UE returns the first response information by using the report resource, the signal strength of the report resource is stronger. Therefore, the base station can count and analyze, according to signal strength of received at least one report resource, a quantity of UE that returns the first response information. When the first responding units 20 of more UE return the first response information by using the report resource, the D2D resource in the D2D resource pool is tighter. Therefore, the base station learns a usage scale condition of the D2D resource in the D2D resource pool and uses a statistics result as a reference basis for further managing the D2D resource pool or appropriately allocating the D2D resource.

Optionally, when the quantity of available D2D resources is greater than the first threshold, the first responding unit 20 of the UE may not respond to the received overflow report instruction.

Further, when the quantity of available D2D resources of the UE is greater than the first threshold, the UE may use any available D2D resource to send a D2D signal, so as to discover a device and establish D2D communication with the device.

Further, the first responding unit 20 includes a first receiving subunit 30, a first generation subunit 40, and a first sending subunit 50.

The first receiving subunit 30 is configured to receive the overflow report instruction broadcast by the base station.

In this embodiment of the present invention, the overflow report instruction received by the first receiving subunit 30 is an instruction periodically broadcast by the base station, and is used to: when the UE is overflow UE, instruct the UE to respond to the overflow report instruction.

The first generation subunit 40 is configured to generate the first response information according to the overflow report instruction.

In this embodiment of the present invention, after the first receiving subunit 30 receives the overflow report instruction broadcast by the base station, the first generation subunit 40 may respond to the instruction and generate the first response information, so that the UE reports the first response information to the base station, and therefore, the base station learns that overflow UE exists, and can adjust the D2D resource capacity in the D2D resource pool. Further, the base station may allocate in advance to the UE at least one report resource, and the first generation subunit 40 may generate the first response information according to the report resource.

Specifically, the signal strength of the first response information may be inversely proportional to the signal strength of the overflow report instruction, so that the base station can parse out, according to the signal strength of the received first response information, the signal strength of the report resource used by the UE. A specific parsing process may be as follows: The signal strength of the overflow report instruction is a, the signal attenuation coefficient is k, and the signal strength of the report resource is b. Therefore, the signal strength of the overflow report instruction received by the UE is a*k, the signal strength of the first response information generated by the first generation subunit 40 of the UE is b/(a*k), and the signal strength of the first response information received by the base station is b/(a*k)*k=b/a. Because the signal strength of the overflow report instruction sent by the base station is a, the base station can learn that the signal strength of the report resource used by the UE is b.

The first sending subunit 50 is configured to transmit the first response information to the base station by using a report resource allocated by the base station.

In this embodiment of the present invention, the first sending subunit 50 may use the report resource allocated by the base station to perform reporting. The base station may allocate in advance a report resource pool including at least one report resource to the first sending subunit 50 of the UE. When reporting the first response information, the first sending subunit 50 of the UE may use any report resource. The report resource pool is a report resource that is allocated by the base station to the UE and used to report information.

In this embodiment of the present invention, according to this embodiment of the present invention, when a user terminal UE needs to perform D2D communication, the UE obtains a quantity of available D2D resources in a D2D resource pool including at least one D2D resource; determines whether the quantity of available D2D resources is less than or equal to a preset threshold; and when the quantity of available D2D resources is less than or equal to the preset threshold, responds to a report instruction broadcast by a base station and returns response information, so that the base station manages the D2D resource pool according to the response information. Therefore, network congestion can be reduced and flexibility of sending D2D resource information by a UE end can be improved.

Figure 3:
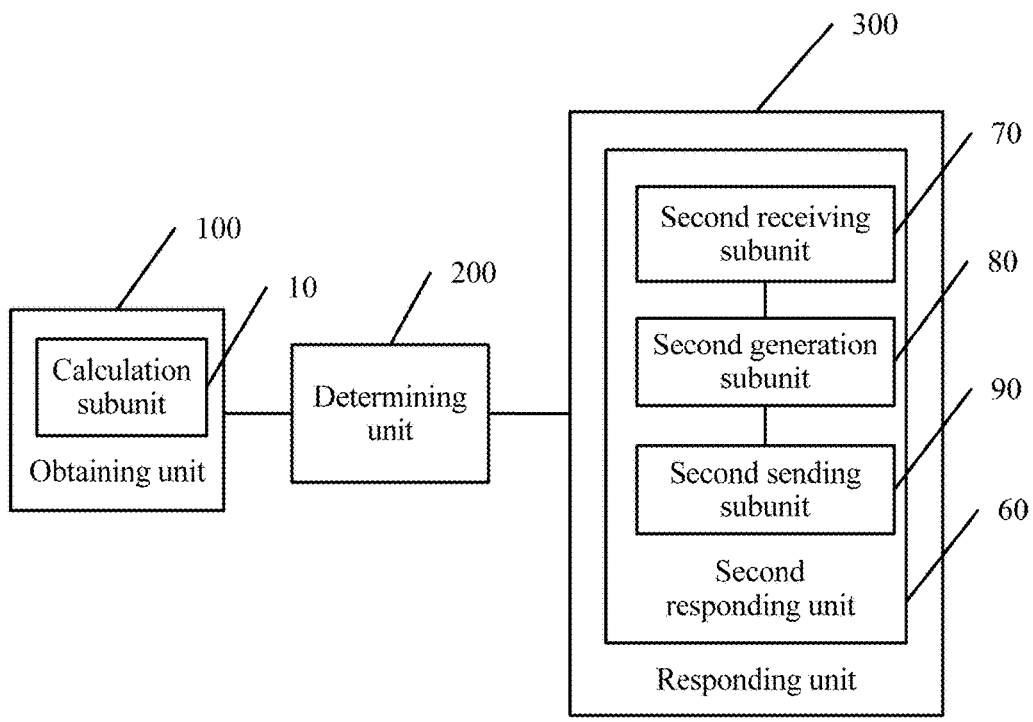
FIG. 3 is a structural diagram of still another embodiment of a terminal device according to the present invention.

Referring to a structural diagram of a terminal device shown in FIG. 3, the terminal device shown in this embodiment of the present invention includes an obtaining unit 100, a determining unit 200, and a responding unit 300.

The responding unit 300 includes second responding unit 60, a second receiving subunit 70, a second generation unit 80, and a second sending unit 90.

The second responding unit 60 is configured to, when the quantity of available D2D resources is less than a preset second threshold, respond to a reduction report instruction broadcast by a base station and return second response information.

In this embodiment of the present invention, when the quantity, of available D2D resources, obtained by the UE is less than or equal to the second threshold, the UE may determine itself as UE for which resource reduction does not need to be performed. The reduction report instruction is an instruction periodically broadcast by the base station, and is used to: when the UE is UE for which resource reduction does not need to be performed, instruct the second responding unit 60 of the UE to respond to the reduction report instruction. Therefore, when the UE receives the reduction report instruction broadcast by the base station and may determine itself as UE for which resource reduction does not need to be performed, the second responding unit 60 of the UE responds to the reduction report instruction and returns the second response information, so that the base station manages a D2D resource pool according to the second response information.

Specifically, when the quantity of available D2D resources is less than or equal to the second threshold, the UE may determine itself as UE for which resource reduction does not need to be performed, and waits to receive the reduction report instruction broadcast by the base station. After the UE receives the reduction report instruction broadcast by the base station, the second responding unit 60 of the UE may respond to the reduction report instruction, generate the second response information, and report the second response information to the base station, so that the base station obtains information that there is no need to reduce a D2D resource in the D2D resource pool. Further, when reporting the second response information, the second responding unit 60 of the UE may use any report resource in the report resource pool allocated by the base station. Preferably, signal strength of the second response information may be inversely proportional to signal strength of the reduction report instruction, so that the base station can parse out, according to the signal strength of the received second response information, the report resource used by the UE. For example, the signal strength of the reduction report instruction is a, a signal attenuation coefficient is k, and signal strength of a random report resource is b. Therefore, the signal strength of the reduction report instruction received by the UE is a*k, the signal strength of the second response information returned by the second responding unit 60 of the UE is b/(a*k), and signal strength of the second response information received by the base station is b/(a*k)*k=b/a. Because the signal strength of the reduction report instruction sent by the base station is a, the base station can learn that signal strength of the report resource used by the UE is b. Signal strength of a report resource relates to a quantity of UE that uses the report resource to perform reporting. It may be understood that, when the second responding units 60 of more UE return the second response information by using the report resource, the signal strength of the report resource is stronger. Therefore, the base station can count and analyze, according to signal strength of received at least one report resource, a quantity of UE that returns the second response information. When more UE returns the second response information by using the report resource, the D2D resource in the D2D resource pool is tighter, and there is no need to perform reduction. Therefore, the base station learns a usage scale condition of the D2D resource in the D2D resource pool and uses a statistics result as a reference basis for further managing the D2D resource pool or for appropriately allocating or reducing the D2D resource.

Further, when the quantity of available D2D resources is greater than the second threshold, the UE may not respond to the received reduction report instruction.

The second receiving subunit 70 is configured to receive the reduction report instruction broadcast by the base station.

In this embodiment of the present invention, the reduction report instruction received by the second receiving subunit 70 is an instruction periodically broadcast by the base station, and is used to: when the UE is UE for which resource reduction does not need to be performed, instruct the UE to respond to the reduction report instruction.

The second generation unit 80 is configured to generate the second response information according to the reduction report instruction.

After the UE receives the reduction report instruction broadcast by the base station, the second generation unit 80 of the UE may respond to the reduction report instruction and generate the second response information, so that the UE reports the second response information to the base station, and therefore, the base station obtains information that there is no need to reduce a D2D resource in the D2D resource pool. Further, when generating the second response information, the second generation subunit 80 may use at least one report resource that is allocated by the base station in advance to the UE.

Preferably, the signal strength of the second response information may be inversely proportional to the signal strength of the reduction report instruction, so that the base station can parse out, according to the signal strength of the received second response information, the report resource used by the UE. For example, the signal strength of the reduction report instruction is a, the signal attenuation coefficient is k, and signal strength of a random report resource is b. Therefore, the signal strength of the reduction report instruction received by the UE is a*k, the signal strength of the second response information generated by the second generation unit 80 of the UE is b/(a*k), and the signal strength of the second response information received by the base station is b/(a*k)*k=b/a. Because the signal strength of the reduction report instruction sent by the base station is a, the base station can learn that signal strength of the report resource used by the UE is b.

The second sending unit 90 is configured to transmit the second response information to the base station by using the report resource.

In this embodiment of the present invention, the second sending unit 90 may perform reporting by using the report resource allocated by the base station. The base station may allocate in advance a report resource pool including at least one report resource to the second sending unit 90 of the UE. When reporting the second response information, the second sending unit 90 of the UE may use any report resource. The report resource pool is a report resource that is allocated by the base station to the UE and used to report information.

In this embodiment of the present invention, according to this embodiment of the present invention, when a user terminal UE needs to perform D2D communication, the UE obtains a quantity of available D2D resources in a D2D resource pool including at least one D2D resource; determines whether the quantity of available D2D resources is less than or equal to a preset threshold; and when the quantity of available D2D resources is less than or equal to the preset threshold, responds to a report instruction broadcast by a base station and returns response information, so that the base station manages the D2D resource pool according to the response information. Therefore, network congestion can be reduced and flexibility of sending D2D resource information by a UE end can be improved.

To better implement the foregoing solutions in the embodiments of the present invention, related steps used to cooperate to implement the foregoing solutions are further provided in the following.

Figure 4:
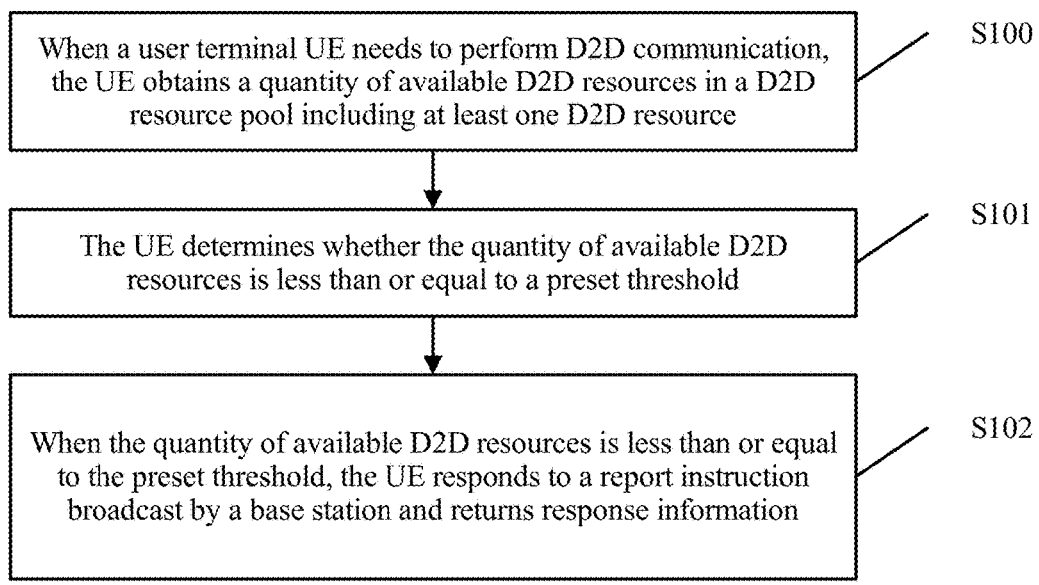
FIG. 4 is a flowchart of an embodiment of a D2D resource management method according to the present invention.

Referring to a schematic flowchart of a D2D resource management method shown in FIG. 4, the D2D resource management method shown in this embodiment of the present invention includes the following steps.

S100. When a user terminal UE needs to perform D2D communication, the UE obtains a quantity of available D2D resources in a D2D resource pool including at least one D2D resource.

In this embodiment of the present invention, the D2D communication is a technology that is applied to a cellular network and in which a cellular cell resource is reused for direct short-range communication under system control. The D2D communications technology changes a communications manner in which originally a base station performs forwarding, to direct communication between UEs (User Equipment, user equipment) that need to perform communication. However, the base station still remains control information transmission with a pair of D2D UEs, so as to implement functions such as interference control and charging, and allocate a D2D resource to a D2D user, so that D2D communication operates on a licensed frequency band. Therefore, data does not need to be transferred by the base station, but is directly transmitted between UEs, thereby lowering communication load on the base station and reducing an occupied communication resource.

In this embodiment of the present invention, when establishing D2D communication, the base station allocates a D2D resource to a user terminal that performs D2D communication, so that the UE can send data by using the D2D resource; or the base station may predefine a D2D resource required for D2D communication, so that the UE can send data by using the D2D resource. According to a specific requirement, the base station allocates a D2D resource pool including at least one D2D resource to the UE that performs D2D communication, so that the user equipment can randomly search for an available D2D resource in the resource pool to perform data transmission. The D2D resource may be a spectrum resource.

Further, in this embodiment of the present invention, when the UE needs to discover a device to perform D2D communication with another UE, the UE needs to use the D2D resource to send a D2D signal to discover the device. Therefore, before the UE sends the D2D signal, the UE first obtains the quantity of available D2D resources in the D2D resource pool allocated by the base station. The available D2D resource may be a D2D resource that is of low interference strength and suitable for communication. In this embodiment of the present invention, the available D2D resource may be a D2D resource whose signal strength is less than a third threshold. Therefore, the UE obtains a quantity of D2D resources, in the D2D resource pool, whose signal strength is less than the third threshold. The third threshold may be a value set by technical personnel.

Further, when signal strength of a D2D resource is greater than the third threshold, interference strength of the D2D resource may be relatively high and the D2D resource is not suitable for communication; or when communication is further performed, the D2D resource interferes with communication data and affects communication quality. Therefore, the D2D resource may be referred to as an unavailable D2D resource.

S101. The UE determines whether the quantity of available D2D resources is less than or equal to a preset threshold.

In this embodiment of the present invention, the threshold may include a first threshold and a second threshold. The first threshold may be less than the second threshold, and the first threshold and the second threshold may be values set by the technical personnel.

S102. When the quantity of available D2D resources is less than or equal to the preset threshold, the UE responds to a report instruction broadcast by a base station and returns response information, so that the base station manages the D2D resource pool according to the response information.

In this embodiment of the present invention, the report instruction broadcast by the base station may include an overflow report instruction and a reduction report instruction. When the quantity, of available D2D resources, obtained by the UE is less than or equal to the first threshold, the UE may determine itself as overflow UE, that is, UE that does not have enough available D2D resources to use. The overflow report instruction is an instruction periodically broadcast by the base station, and is used to: when the UE is overflow UE, instruct the UE to respond to the overflow report instruction. Therefore, when the UE may determine itself as overflow UE and receives the overflow report instruction broadcast by the base station, the UE responds to the overflow report instruction and returns first response information, so that the base station manages the D2D resource pool according to the first response information.

Further, when the quantity, of available D2D resources, obtained by the UE is less than or equal to the second threshold, the UE may determine itself as UE for which resource reduction does not need to be performed. The reduction report instruction is an instruction periodically broadcast by the base station, and is used to: when the UE is UE for which resource reduction does not need to be performed, instruct the UE to respond to the reduction report instruction. Therefore, when the UE may determine itself as UE for which resource reduction does not need to be performed, and receives the reduction report instruction broadcast by the base station, the UE responds to the reduction report instruction and returns second response information, so that the base station manages the D2D resource pool according to the second response information.

Preferably, when the quantity, of available D2D resources, obtained by the UE is less than or equal to the first threshold, the UE may respond to the overflow report instruction and the reduction report instruction.

In this embodiment of the present invention, according to this embodiment of the present invention, when a user terminal UE needs to perform D2D communication, the UE obtains a quantity of available D2D resources in a D2D resource pool including at least one D2D resource; determines whether the quantity of available D2D resources is less than or equal to a preset threshold; and when the quantity of available D2D resources is less than or equal to the preset threshold, responds to a report instruction broadcast by a base station and returns response information, so that the base station manages the D2D resource pool according to the response information. Therefore, network congestion can be reduced and flexibility of sending D2D resource information by a UE end can be improved.

Figure 5:
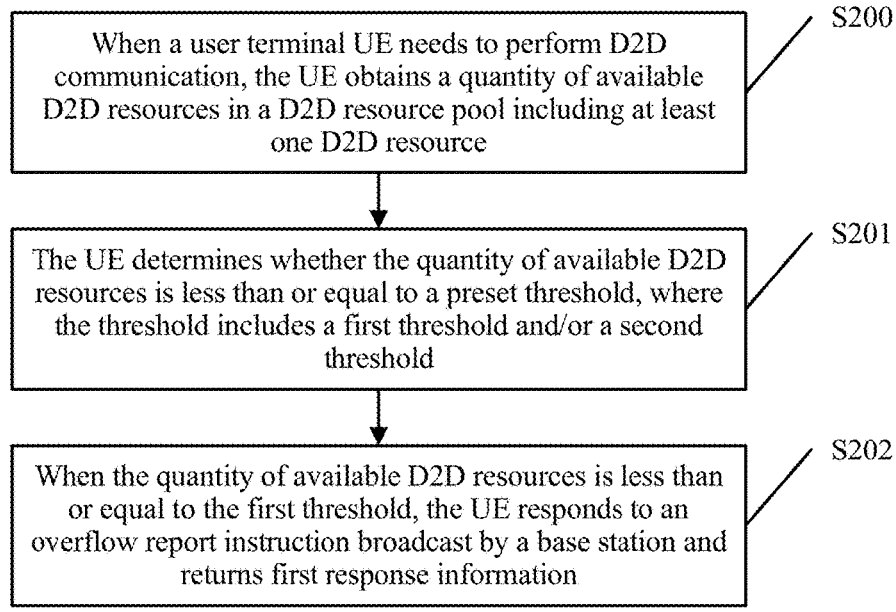
FIG. 5 is a flowchart of another embodiment of a D2D resource management method according to the present invention.

Referring to a schematic flowchart of a D2D resource management method shown in FIG. 5, the D2D resource management method shown in this embodiment of the present invention includes the following steps.

S200. When a user terminal UE needs to perform D2D communication, the UE obtains a quantity of available D2D resources in a D2D resource pool including at least one D2D resource.

S201. The UE determines whether the quantity of available D2D resources is less than or equal to a preset threshold, where the threshold includes a first threshold and/or a second threshold.

S202. When the quantity of available D2D resources is less than or equal to the first threshold, the UE responds to an overflow report instruction broadcast by a base station and returns first response information.

In this embodiment of the present invention, when the quantity, of available D2D resources, obtained by the UE is less than or equal to the first threshold, the UE may determine itself as overflow UE, that is, UE that does not have enough available D2D resources to use. The overflow report instruction is an instruction periodically broadcast by the base station, and is used to: when the UE is overflow UE, instruct the UE to respond to the overflow report instruction. Therefore, when the UE may determine itself as overflow UE and receives the overflow report instruction broadcast by the base station, the UE responds to the overflow report instruction and returns the first response information, so that the base station manages the D2D resource pool according to the first response information.

Specifically, when the quantity of available D2D resources is less than or equal to the first threshold, the UE may determine itself as overflow UE and waits to receive the overflow report instruction broadcast by the base station. After receiving the overflow report instruction broadcast by the base station, the UE may respond to the overflow report instruction, generate the first response information, and report the first response information to the base station, so that the base station learns that overflow UE exists, and can further adjust a D2D resource capacity in the D2D resource pool. After determining itself as overflow UE, the UE does not send a D2D signal anymore and waits to receive the overflow report instruction broadcast by the base station, so that the UE does not interfere with another UE that is communicating. Further, the base station may allocate in advance to the UE a report resource pool including at least one report resource. When reporting the first response information, the UE may use any report resource. The report resource pool is a report resource that is allocated by the base station to the UE and used to report information.

Specifically, signal strength of the first response information may be inversely proportional to signal strength of the overflow report instruction, so that the base station can parse out, according to the signal strength of the received first response information, signal strength of the report resource used by the UE. A specific parsing process may be as follows: The signal strength of the overflow report instruction is a, a signal attenuation coefficient is k, and signal strength of a random report resource is b. Therefore, signal strength of the overflow report instruction received by the UE is a*k, the signal strength of the first response information returned by the UE is b/(a*k), and signal strength of the first response information received by the base station is b/(a*k)*k=b/a. Because the signal strength of the overflow report instruction sent by the base station is a, the base station can learn that the signal strength of the report resource used by the UE is b. Signal strength of a report resource relates to a quantity of UE that uses the report resource to perform reporting. Therefore, it may be understood that, when more UE returns the first response information by using the report resource, the signal strength of the report resource is stronger. Therefore, the base station can count and analyze, according to signal strength of received at least one report resource, a quantity of UE that returns the first response information. When more UE returns the first response information by using the report resource, the D2D resource in the D2D resource pool is tighter. Therefore, the base station learns a usage scale condition of the D2D resource in the D2D resource pool and uses a statistics result as a reference basis for further managing the D2D resource pool or appropriately allocating the D2D resource.

Optionally, when the quantity of available D2D resources is greater than the first threshold, the UE may not respond to the received overflow report instruction.

Further, when the quantity of available D2D resources of the UE is greater than the first threshold, the UE may use any available D2D resource to send a D2D signal, so as to discover a device and establish D2D communication with the device.

For step S200 and step S201 in this embodiment of the present invention, refer to step S100 and step S101 in the foregoing embodiment; details are not described herein.

In this embodiment of the present invention, according to this embodiment of the present invention, when a user terminal UE needs to perform D2D communication, the UE obtains a quantity of available D2D resources in a D2D resource pool including at least one D2D resource; determines whether the quantity of available D2D resources is less than or equal to a preset threshold; and when the quantity of available D2D resources is less than or equal to the preset threshold, responds to a report instruction broadcast by a base station and returns response information, so that the base station manages the D2D resource pool according to the response information. Therefore, network congestion can be reduced and flexibility of sending D2D resource information by a UE end can be improved.

Figure 6:
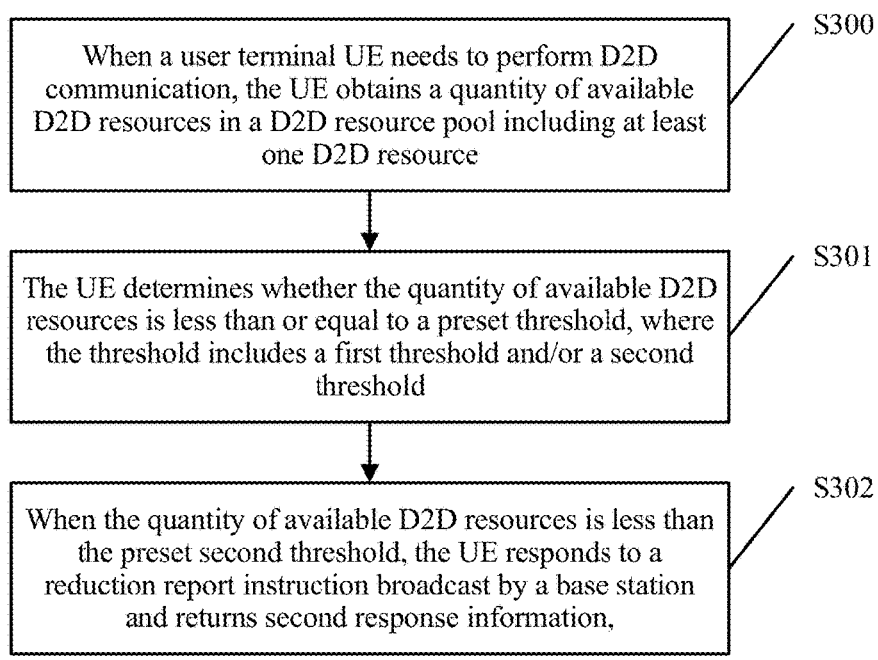
FIG. 6 is a flowchart of still another embodiment of a D2D resource management method according to the present invention.

Referring to a schematic flowchart of a D2D resource management method shown in FIG. 6, the D2D resource management method shown in this embodiment of the present invention includes the following steps.

S300. When a user terminal UE needs to perform D2D communication, the UE obtains a quantity of available D2D resources in a D2D resource pool including at least one D2D resource.

S301. The UE determines whether the quantity of available D2D resources is less than or equal to a preset threshold, where the threshold includes a first threshold and/or a second threshold.

S302. When the quantity of available D2D resources is less than the preset second threshold, the UE responds to a reduction report instruction broadcast by the base station and returns second response information.

In this embodiment of the present invention, when the quantity, of available D2D resources, obtained by the UE is less than or equal to the second threshold, the UE may determine itself as UE for which resource reduction does not need to be performed. The reduction report instruction is an instruction periodically broadcast by the base station, and is used to: when the UE is UE for which resource reduction does not need to be performed, instruct the UE to respond to the reduction report instruction. Therefore, when the UE may determine itself as UE for which resource reduction does not need to be performed, and receives the reduction report instruction broadcast by the base station, the UE responds to the reduction report instruction and returns the second response information, so that the base station manages the D2D resource pool according to the second response information.

Specifically, when the quantity of available D2D resources is less than or equal to the second threshold, the UE may determine itself as UE for which resource reduction does not need to be performed, and waits to receive the reduction report instruction broadcast by the base station. After receiving the reduction report instruction broadcast by the base station, the UE may respond to the reduction report instruction, generate the second response information, and report the second response information to the base station, so that the base station obtains information that there is no need to reduce a D2D resource in the D2D resource pool. Further, when reporting the second response information, the UE may use any report resource in the report resource pool allocated by the base station to the UE. Preferably, signal strength of the second response information may be inversely proportional to signal strength of the reduction report instruction, so that the base station can parse out, according to the signal strength of the received second response information, the report resource used by the UE. For example, the signal strength of the reduction report instruction is a, a signal attenuation coefficient is k, and signal strength of a random report resource is b. Therefore, signal strength of the reduction report instruction received by the UE is a*k, signal strength of the second response information returned by the UE is b/(a*k), and signal strength of the second response information received by the base station is b/(a*k)*k=b/a. Because the signal strength of the reduction report instruction sent by the base station is a, the base station can learn that signal strength of the report resource used by the UE is b. Signal strength of a report resource relates to a quantity of UE that uses the report resource to perform reporting. It may be understood that, when more UE returns the second response information by using the report resource, the signal strength of the report resource is stronger. Therefore, the base station can count and analyze, according to signal strength of received at least one report resource, a quantity of UE that returns the second response information. When more UE returns the second response information by using the report resource, the D2D resource in the D2D resource pool is tighter, and there is no need to perform reduction. Therefore, the base station learns a usage scale condition of the D2D resource in the D2D resource pool and uses a statistics result as a reference basis for further managing the D2D resource pool or for appropriately allocating or reducing the D2D resource.

Further, when the quantity of available D2D resources is greater than the second threshold, the UE may not respond to the received reduction report instruction.

For step S300 and step S301 in this embodiment of the present invention, refer to step S100 and step S101 in the foregoing embodiment; details are not described herein.

In this embodiment of the present invention, according to this embodiment of the present invention, when a user terminal UE needs to perform D2D communication, the UE obtains a quantity of available D2D resources in a D2D resource pool including at least one D2D resource; determines whether the quantity of available D2D resources is less than or equal to a preset threshold; and when the quantity of available D2D resources is less than or equal to the preset threshold, responds to a report instruction broadcast by a base station and returns response information, so that the base station manages the D2D resource pool according to the response information. Therefore, network congestion can be reduced and flexibility of sending D2D resource information by a UE end can be improved.

Figure 7:
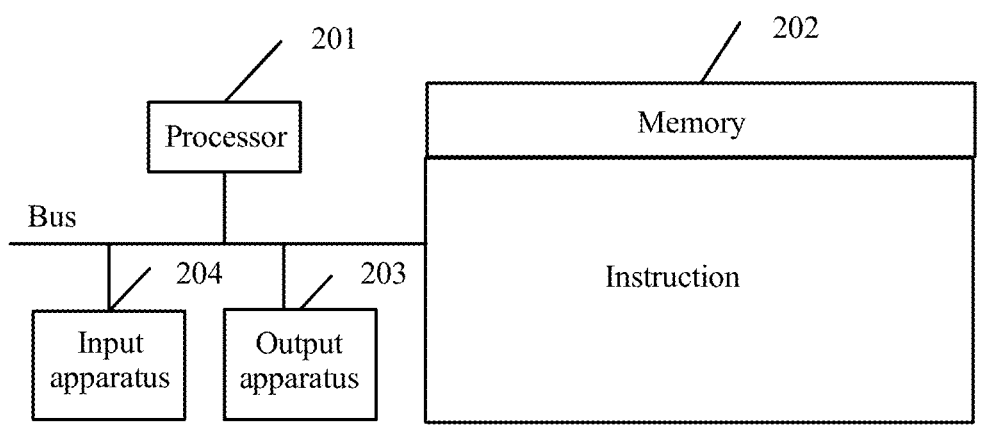
FIG. 7 is a structural diagram of yet another embodiment of a terminal device according to the present invention.

Referring to FIG. 7, an embodiment of the present invention further provides a terminal device, which may include:

a processor 201 (there may be one or more processors 201 in the device, and one processor is used as an example in FIG. 7), a memory 202, an output apparatus 203, and an input apparatus 204. In this embodiment of the present invention, the processor 201, the memory 202, the output apparatus 203, and the input apparatus 204 may be connected by using a bus or in another manner. In FIG. 7, a bus connection is used as an example.

The processor 201 executes the following steps:

when a user terminal UE needs to perform D2D communication, obtain a quantity of available D2D resources in a D2D resource pool including at least one D2D resource;

determine whether the quantity of available D2D resources is less than or equal to a preset threshold; and when the quantity of available D2D resources is less than or equal to the preset threshold, respond to a report instruction broadcast by a base station and control the output apparatus 203 to return response information, so that the base station manages the D2D resource pool according to the response information.

That the processor 201 obtains the quantity of available D2D resources in the D2D resource pool including at least one D2D resource includes:

calculating a quantity of all D2D resources whose signal strength is less than or equal to a third threshold in the D2D resource pool.

The threshold includes a first threshold and/or a second threshold.

That when the quantity of available D2D resources is less than or equal to the preset threshold, the processor 201 responds to the report instruction broadcast by the base station and returns the response information includes:

when the quantity of available D2D resources is less than or equal to the first threshold, responding to an overflow report instruction broadcast by the base station and controlling the output apparatus 203 to return first response information.

That when the quantity of available D2D resources is less than or equal to the preset first threshold, the processor 201 responds to first report instruction broadcast by the base station and controls the output apparatus 203 to return the first response information includes:

controlling the input apparatus 204 to receive the overflow report instruction broadcast by the base station;

generating the first response information according to the overflow report instruction; and controlling the output apparatus 203 to transmit the first response information to the base station by using a report resource allocated by the base station.

That when the quantity of available D2D resources is less than or equal to the preset threshold, the processor 201 responds to the report instruction broadcast by the base station and controls the output apparatus 203 to return the response information includes:

when the quantity of available D2D resources is less than the preset second threshold, responding to a reduction report instruction broadcast by the base station and controlling the output apparatus 203 to return second response information.

That the processor 201 responds to the reduction report instruction broadcast by the base station and controls the output apparatus 203 to return the second response information includes:

controlling the input apparatus 204 to receive the reduction report instruction broadcast by the base station;

generating the second response information according to the reduction report instruction; and controlling the output apparatus 203 to transmit the second response information to the base station by using the report resource.

Signal strength of the first response information is inversely proportional to signal strength of the first report instruction.

Signal strength of the second response information is inversely proportional to signal strength of the second report instruction.

It can be learned from the foregoing that, according to this embodiment of the present invention, when a user terminal UE needs to perform D2D communication, the UE obtains a quantity of available D2D resources in a D2D resource pool including at least one D2D resource; determines whether the quantity of available D2D resources is less than or equal to a preset threshold; and when the quantity of available D2D resources is less than or equal to the preset threshold, responds to a report instruction broadcast by a base station and returns response information, so that the base station manages the D2D resource pool according to the response information. Therefore, network congestion can be reduced and flexibility of sending D2D resource information by a UE end can be improved.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously.

It should be further appreciated by a person skilled in the art that the embodiments described in this specification all belong to exemplary embodiments, and the involved actions and modules are not necessarily required by the present invention.

In the foregoing embodiments, the description of each embodiment has respective focuses. For a part that is not described in detail in an embodiment, reference may be made to related descriptions in other embodiments.

In conclusion, in the embodiments of the present invention, according to the embodiments of the present invention, when a user terminal UE needs to perform D2D communication, the UE obtains a quantity of available D2D resources in a D2D resource pool including at least one D2D resource; determines whether the quantity of available D2D resources is less than or equal to a preset threshold; and when the quantity of available D2D resources is less than or equal to the preset threshold, responds to a report instruction broadcast by a base station and returns response information, so that the base station manages the D2D resource pool according to the response information. Therefore, network congestion can be reduced and flexibility of sending D2D resource information by a UE end can be improved.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disc, an optical disc, a read-only memory (Read-Only Memory, ROM), or a random access memory (Random Access Memory, RAM).

The foregoing disclosed descriptions are merely exemplary embodiments of the present invention, but are not intended to limit the scope of the claims of the present invention. Therefore, equivalent variations made according to the claims of the present invention shall fall within the scope of the present invention.

What is claimed is:

1. A D2D resource management method, comprising:
   when a user terminal (UE) needs to perform device-to-device (D2D) communication, obtaining, by the UE, a quantity of available D2D resources in a D2D resource pool comprising at least one D2D resource;
   determining, by the UE, whether the quantity of available D2D resources is less than or equal to a threshold, wherein the threshold comprises a first threshold and/or a second threshold; and
   when the quantity of available D2D resources is less than or equal to the threshold, responding, by the UE, to a report instruction broadcast by a base station and returning response information, to enable the base station to manage the D2D resource pool according to the response information, comprising:
      when the quantity of available D2D resources is less than or equal to the first threshold, responding, by the UE, to an overflow report instruction broadcast by the base station and returning first response information, wherein signal strength of the first response information is inversely proportional to signal strength of the overflow report instruction.

2. The method according to claim 1, wherein obtaining, by the UE, the quantity of available D2D resources in the D2D resource pool comprising at least one D2D resource comprises:
   calculating, by the UE, a quantity of all D2D resources whose signal strength is less than or equal to a third threshold in the D2D resource pool.

3. The method according to claim 1, wherein when the quantity of available D2D resources is less than or equal to the first threshold, responding, by the UE, to the overflow report instruction broadcast by the base station and returning first response information comprises:
   receiving, by the UE, the overflow report instruction broadcast by the base station;
   generating, by the UE, the first response information according to the overflow report instruction; and
   transmitting, by the UE, the first response information to the base station by using a report resource allocated by the base station.

4. The method according to claim 1, wherein when the quantity of available D2D resources is less than or equal to the threshold, responding, by the UE, to the report instruction broadcast by the base station and returning response information comprises:
   when the quantity of available D2D resources is less than the second threshold, responding, by the UE, to a reduction report instruction broadcast by the base station and returning second response information.

5. The method according to claim 4, wherein responding, by the UE, to the reduction report instruction broadcast by the base station and returning second response information comprises:
   receiving, by the UE, the reduction report instruction broadcast by the base station;
   generating, by the UE, the second response information according to the reduction report instruction; and
   transmitting, by the UE, the second response information to the base station by using the report resource.

6. A D2D resource management method, comprising:
when a user terminal (UE) needs to perform device-to-device (D2D) communication, obtaining, by the UE. a quantity of available D2D resources in a D2D resource pool comprising at least one D2D resource;
determining, by the UE, whether the quantity of available D2D resources is less than or equal to a threshold, wherein the threshold comprises a first threshold and/or a second threshold; and
when the quantity of available D2D resources is less than or equal to the threshold, responding, by the UE, to a report instruction broadcast by a base station and returning response information, to enable the base station to manage the D2D resource pool according to the response information, comprising:
when the quantity of available D2D resources is less than the second threshold, responding, by the UE, to a reduction report instruction broadcast by the base station and returning second response information, wherein signal strength of the second response information is inversely proportional to signal strength of a second report instruction.

7. A non-transitory computer-readable storage medium comprising instructions that, when executed by a processor, cause the processor to:
when a user terminal (UE) needs to perform device-to-device (D2D) communication, obtain a quantity of available D2D resources in a D2D resource pool comprising at least one D2D resource;
determine whether the quantity of available D2D resources is less than or equal to a threshold, wherein the threshold comprises a first threshold and/or a second threshold; and
when the quantity of available D2D resources is less than or equal to the threshold, respond to a report instruction broadcast by a base station and return response information, to enable the base station to manage the D2D resource pool according to the response information, comprising:
when the quantity of available D2D resources is less than or equal to the first threshold, respond to an overflow report instruction broadcast by the base station and return first response information, wherein signal strength of the first response information is inversely proportional to signal strength of the overflow report instruction.

8. A terminal device (UE), comprising:
an input apparatus, an output apparatus, a memory, and a processor, wherein the memory stores program code, and the processor is configured to invoke the program code stored in the memory to cause the UE to:
when the UE needs to perform device-to-device (D2D) communication, obtain a quantity of available D2D resources in a D2D resource pool comprising at least one D2D resource;
determine whether the quantity of available D2D resources is less than or equal to a threshold, wherein the threshold comprises a first threshold and/or a second threshold; and
when the quantity of available D2D resources is less than or equal to the threshold, respond to a report instruction broadcast by a base station and control the output apparatus to return response information, to enable the base station to manage the D2D resource pool according to the response information, comprising:
when the quantity of available D2D resources is less than or equal to the first threshold, respond to an overflow report instruction broadcast by the base station and control the output apparatus to return first response information, wherein signal strength of the first response information is inversely proportional to signal strength of the overflow report instruction.

9. The device according to claim 8, wherein the processor is configured to invoke the program code stored in the memory to further cause the UE to:
calculate a quantity of all D2D resources whose signal strength is less than or equal to a third threshold, in the D2D resource pool.

10. The device according to claim 8, wherein the processor is configured to invoke the program code stored in the memory to further cause the UE to: control the input apparatus to receive the overflow report instruction broadcast by the base station; generate the first response information according to the overflow report instruction; and control the output apparatus to transmit the first response information to the base station by using a report resource allocated by the base station.

11. The device according to claim 8, wherein the processor is configured to invoke the program code stored in the memory to further cause the UE to:
when the quantity of available D2D resources is less than the preset second threshold, respond to a reduction report instruction broadcast by the base station and control the output apparatus to return second response information.

12. The device according to claim 11, wherein the processor is configured to invoke the program code stored in the memory to further cause the UE to:
control the input apparatus to receive the reduction report instruction broadcast by the base station;
generate the second response information according to the reduction report instruction; and
control the output apparatus to transmit the second response information to the base station by using the report resource.

13. A terminal device (UE), comprising:
an input apparatus, an output apparatus, a memory, and a processor, wherein the memory stores program code, and the processor is configured to invoke the program code stored in the memory to cause the UE to:
when the UE needs to perform device-to-device (D2D) communication, obtain a quantity of available D2D resources in a D2D resource pool comprising at least one D2D resource;
determine whether the quantity of available D2D resources is less than or equal to a threshold, wherein the threshold comprises a first threshold and/or a second threshold; and
when the quantity of available D2D resources is less than or equal to the threshold, respond to a report instruction broadcast by a base station and control the output apparatus to return response information, to enable the base station to manage the D2D resource pool according to the response information, comprising:
when the quantity of available D2D resources is less than the second threshold, respond to a reduction report instruction broadcast by the base station and control the output apparatus to return second response information, wherein signal strength of the second response information is inversely proportional to signal strength of a second report instruction.

* * * * *